INVENTOR:
HOWARD E. WILTSEY
BY: Emerson B Donnell
ATTORNEY

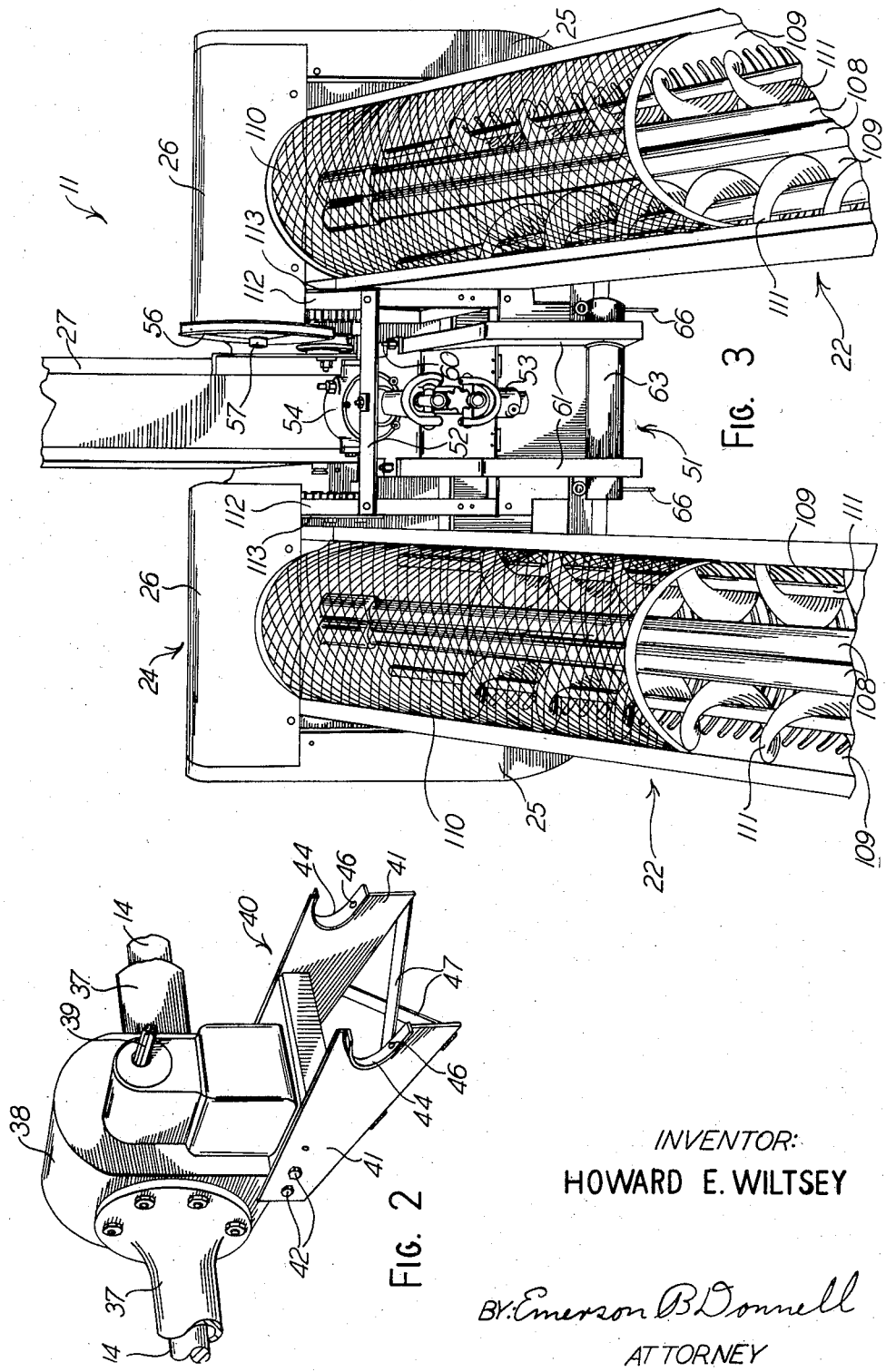

March 18, 1958     H. E. WILTSEY     2,826,887
COTTON PICKING UNIT AND MOUNTING MEANS THEREFOR
Filed June 29, 1954     5 Sheets-Sheet 3

INVENTOR:
HOWARD E. WILTSEY

BY: Emerson B. Donnell
ATTORNEY

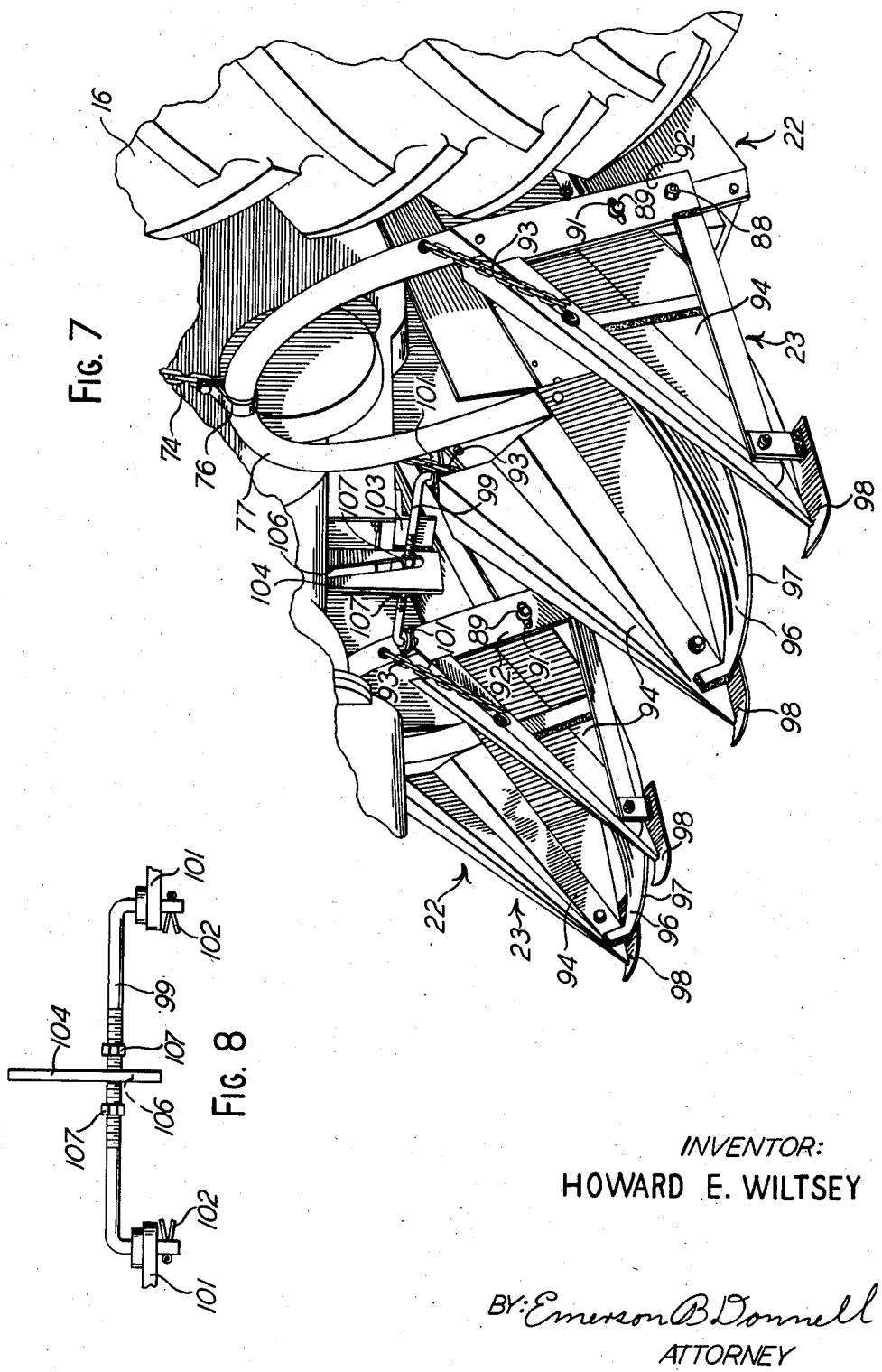

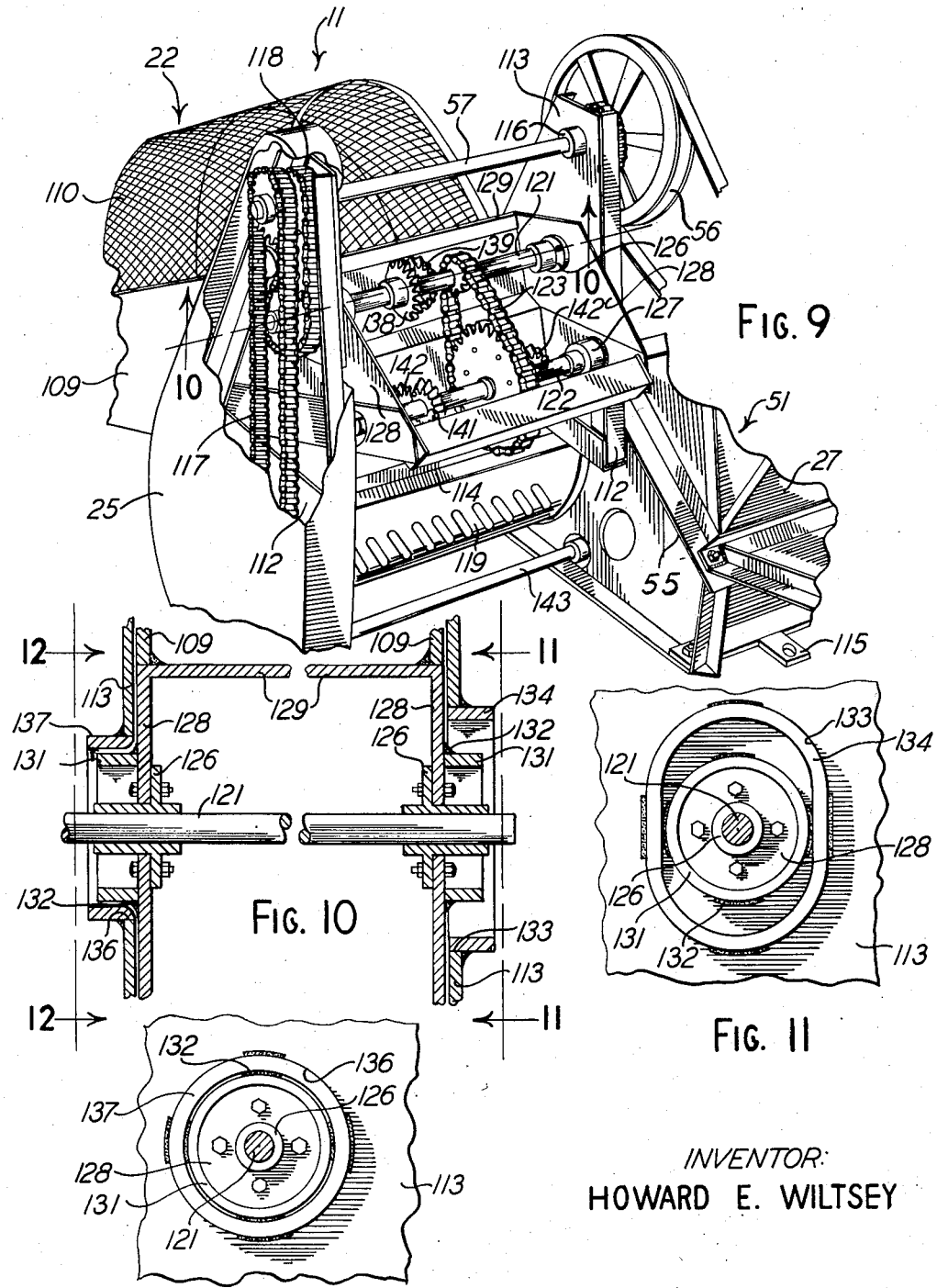

United States Patent Office 2,826,887
Patented Mar. 18, 1958

2,826,887

COTTON PICKING UNIT AND MOUNTING MEANS THEREFOR

Howard E. Wiltsey, Racine, Wis., assignor to J. I. Case Company, Racine, Wis., a corporation of Wisconsin Application June 29, 1954, Serial No. 439,979

10 Claims. (Cl. 56—14)

This invention relates to a cotton harvester, and, more particularly, it relates to the mounting onto a tractor of a cotton stripper.

It is an object of this invention to provide a means for attaching a cotton stripper to a tractor, with a minimum of time and effort.

Another object of this invention is to provide a cotton stripper which is capable of withstanding upward forces, such as those encountered in operating over bumpy ground, acting on the bottom of the harvester. Specifically, this object is achieved by providing an articulated stripper frame whereby the forward and rearward ends thereof can pivot upwardly with respect to the rear ends.

Still another object is the provision of means for attaching a two row cotton stripper to a tractor whereby the two picking units automatically align with respect to the ground and the two rows of cotton plants, reducing the tractor steering to a reasonable degree of accuracy.

Another object of this invention is to provide a cotton stripper with picking units which are self-aligning with respect to the ground and the rows of cotton plants.

Another object of this invention is to provide a cotton stripper with a pair of picking units which are self-aligning with respect to the rows of cotton plants and which are adjustably limited in said self-aligning action.

Other objects and advantages will become apparent upon reading the following description in light of the accompanying drawings, wherein, Fig. 1 is a fragmentary side perspective view of a tractor with a cotton stripper attached, all of a preferred embodiment of this invention.

Fig. 2 is an enlarged side perspective view of a fragment of the rear end of the tractor shown in Fig. 1.

Fig. 3 is an enlarged front perspective view of a fragment of the cotton stripper shown in Fig. 1.

Fig. 7 is an enlarged fragmentary front perspective view of the tractor and the cotton stripper shown in Fig. 1, but from the side opposite to that of Fig. 6.

Fig. 8 is an enlarged front elevational view of certain parts shown in Fig. 7.

Fig. 9 is an enlarged rear perspective view, with parts broken away, of a part of the cotton stripper shown in Fig. 1.

Fig. 10 is a fragmentary sectional view taken on the line 10—10 of Fig. 9.

Fig. 11 is a sectional view taken on the line 11—11 of Fig. 10.

Fig. 12 is a sectional view taken on the line 12—12 of Fig. 10.

Similar reference numerals refer to similar parts throughout all of the views.

Figure 1:
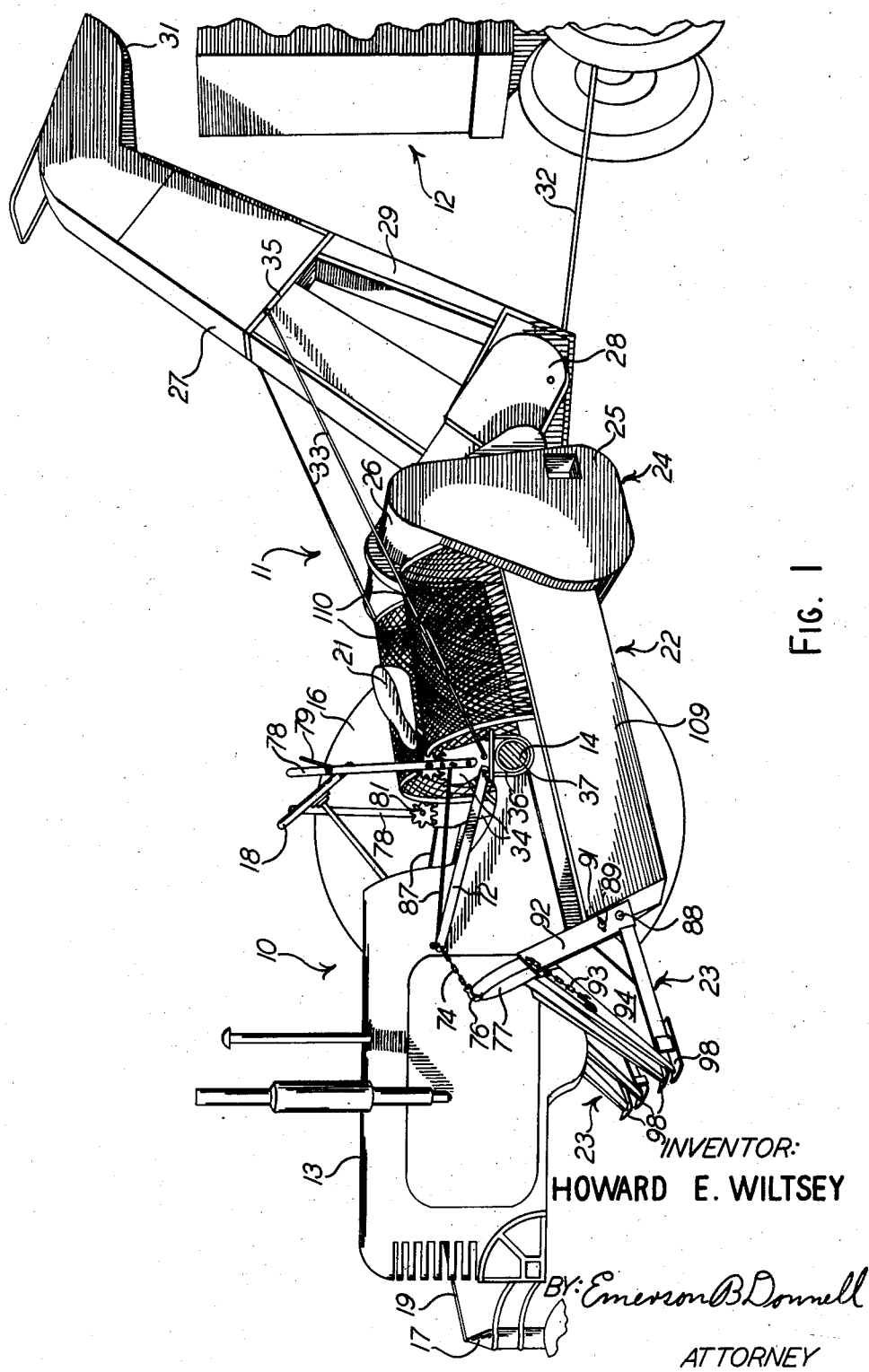

Fig. 1 shows diagrammatically a tractor 10 with a cotton stripper 11 attached thereto in a manner fully described hereinafter. A wagon 12 is draft connected to the stripper 11 to be towed by the tractor 10. In this arrangement, with the exception of the picking unit runners, the stripper 11 does not rest upon the ground as it is carried and powered by the tractor. The operation of the entire assembly, which may be termed a cotton harvester, moves the harvester through the cotton field with the stripper 11 removing cotton bolls from the cotton plants and conveying the bolls to the wagon 12.

It should be noticed that Fig. 1 shows the tractor with a body 13 and a rear wheel axle 14. Mounted on opposite ends of the axle 14 would be the usual wheels 16. However, for convenience of description, the near wheel is not shown. The usual tractor front wheel mounting 17 is located at the forward end of the tractor 10. Also a conventional tractor steering wheel 18, steering rod 19, and an operator's seat 21 are included in the tractor as indicated in Fig. 1. As previously mentioned, a cotton stripper 11 is mounted on the tractor 10. The stripper consists of a pair of inclined cotton picking units 22 with each unit located between the tractor body 13 and one of the tractor wheels 16, immediately below the tractor axle 14. The forward ends of the picking units 22 terminate approximately mid-way between the tractor front and rear wheels with a gathering shoe or gathering point 23 attached at the front of each unit 22 as a part thereof. The central portion 24 of the stripper 11 includes the main frame of the stripper and the side and top housings 25 and 26, respectively, which enclose the power drive mechanism. The rearward portion of the stripper contains an elevator housing 27, a fan housing 28, and a fan duct 29. It is conventional that the cotton bolls are discharged from the stripper 11 at the outlet end 31 of the elevator housing 27. From there the bolls are blown by the air from the fan duct 29, which extends up to the outlet 31, into the trailing wagon 12. At this point, it should be observed that the wagon 12 is hitched to the stripper 11 through the draw bar 32 to remain in a desired position with respect to the outlet 31.

Most of what has been described in the foregoing in connection with Fig. 1 is conventional and, therefore, need not be further described. However, it should be understood that the tractor wheels and the wagon wheels, along with the lower front parts of the gathering shoes 23, are the only members which are normally on the ground. In this regard, attention is directed to a pair of truss rods 33 which are attached between the tractor 10 and the stripper elevator housing 27 to support the stripper on the tractor in a manner more fully described later. For now it should be noticed that the rods 33 each connect to a quadrant plate 34 mounted on the tractor by a U-bolt 36 which is clamped to a housing 37 of the tractor axle 14. Also, the opposite ends of the truss rods attach to the housing 27 through a strap 35, in any well known manner of attaching.

The herein preferred manner of attaching the main frame of the stripper unit 11 to the tractor 10 is by means of the truss rods 33 in conjunction with another connection which will now be described. As shown in Fig. 2, the tractor axle 14 and the axle housing 37 project to each side of an intermediate tractor transmission housing 38, all of which is located at the rear of the tractor 10. A power take-off shaft 39 is shown to project to the rear of the housing 38 and it should be understood that the shaft 39 drivingly engages the cotton stripper unit 11 to empower the latter, as will be more apparent later. An important feature of the construction shown in Fig. 2 is the attachment to the tractor of a mounting frame 40 composed of a pair of vertically disposed plates 41 which are connected by bolts 42 to the base of the transmission housing 38 and, therefore, to the tractor 10. The plates 41 extend rearwardly of the tractor with the rear end of each of the plates terminating in a curved recess 43 (see Fig. 5) wherein a U-shaped saddle member 44 is secured by preferably welding to the plate. A pair of vertically aligned holes 46 is provided in each of the members 44 for a reason which will be apparent later. To support the plates 41, a pair of cross braces 47 is provided to be welded to the lower edges of the plates. It is preferred that the mounting frame 40 be bolted to the tractor 10 in the same place that the usual tractor drawbar is attached. For this purpose, the drawbar is therefore removed.

Figures 4, 5, 6:
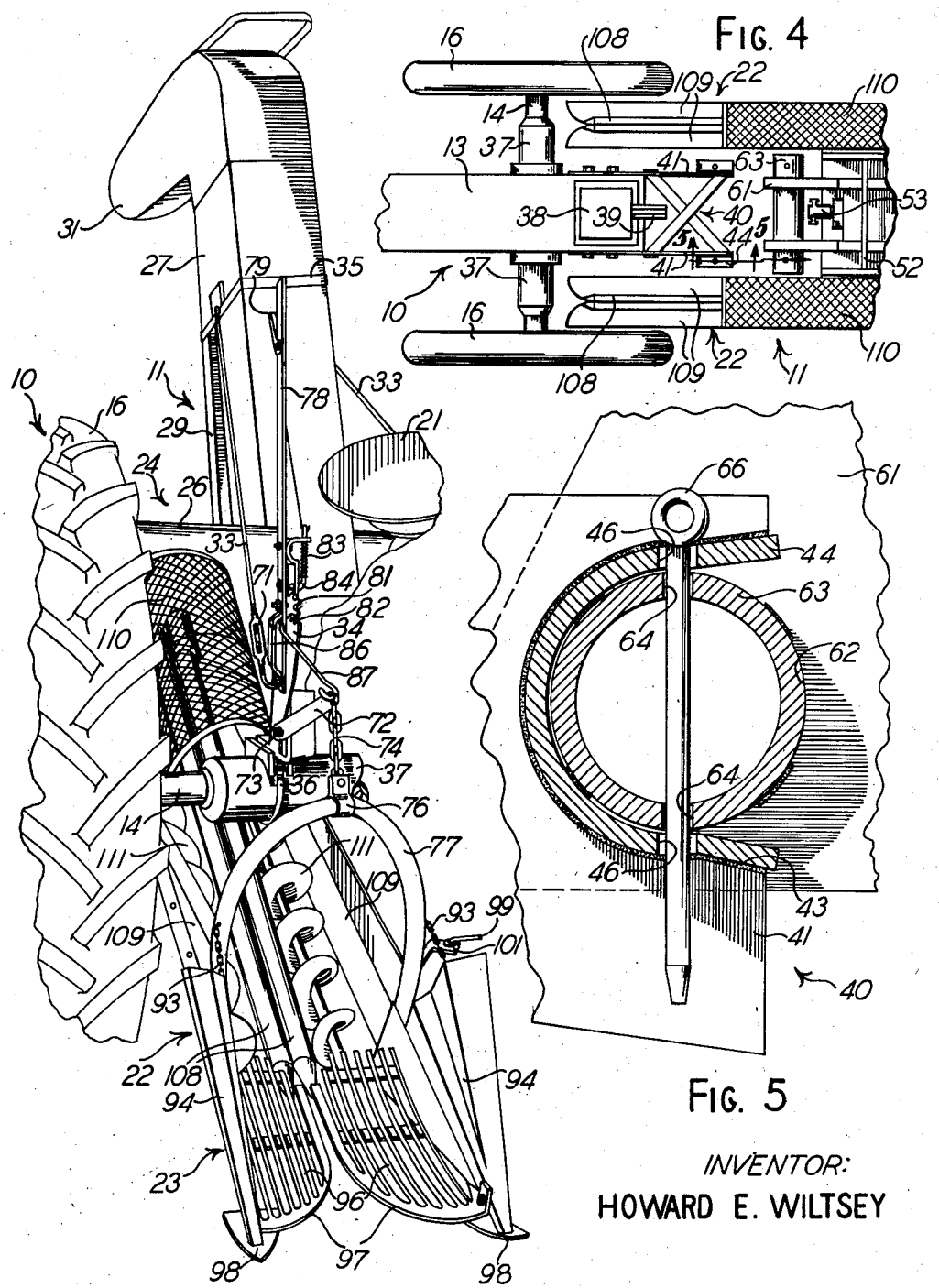
Fig. 4 is a reduced fragmentary top plan diagrammatic view of the tractor unit and the cotton stripper unit shown in Fig. 1 but with said units separated.
Fig. 5 is an enlarged side sectional view of the rear of the tractor unit and the front of the cotton stripper unit shown in Fig. 4 but with said units connected together and with the section taken along the line 5—5 of Fig. 4.
Fig. 6 is an enlarged fragmentary front perspective view of the tractor and the cotton stripper shown in Fig. 1.

Fig. 3 is a view from the front of the stripper unit 11 and it clearly shows the pair of cotton picking units 22 spaced apart and extending forwardly. The spacing between the center lines of the units 22 is the same as the spacing between two adjacent rows of cotton plants. Again, the mid-portion 24 of the unit 11 contains the chain drive housing 25 and the drive shaft housing 26. Shown as an integral part of the unit 11 is a main frame 51 which is composed of connected lengths of angle irons 52 and 55, of Fig. 9, and sheet metal pieces. Connected to the frame 51, immediately in front of the elevator housing 27, is a universal joint coupler 53 which operatively engages the power take-off shaft 39 when the unit 11 is attached to the tractor. Therefore, power is relayed to the universal joint coupler 53 and to the gear box 54 connected therewith. From there the power is transmitted to a pulley 56 which is rotatably mounted adjacent the housing 26 by means of a shaft 57. Part of the main frame 51 of the stripper unit 11 is a pair of vertically disposed plates 61 which project forwardly from the central portion of the unit. The plates 61 are, of course, rigidly attached to the frame 51 in any well known manner such as through bolts like bolt 60. (Also see Figs. 4 and 5.) The forward and lower corners of the plates 61 contain aligned cylindrical openings 62 which receive a roll connector 63. The latter is thus horizontally disposed and preferably welded to the plates 61 to be secured thereto. As shown in Figs. 3, 4, and 5, the roll 63 projects beyond the outside faces of the plates 61 and contains a pair of vertically aligned holes 64 at each projecting end of the roll.

The parts of Figs. 2 and 3 are combined to form Fig. 4 which is a plan view of parts of the tractor and of the stripper unit with the two unattached and separated. In this view, it is indicated that the tractor 10 can be backed to the position shown where the tractor wheels 16 span the picking units 22, and the roll 63 is aligned with the saddles 44, and the power take-off shaft 39 is aligned with the coupler 53. At this time, part of the front of the unit 22 is removed to be replaced later. Upon backing the tractor 10 further into the stripper unit 11, the tractor axle housings 37 pass above the picking units 22 (as shown in Figs. 1 and 6) and the saddles 44 engage the roll 63 while the power take-off connection is also completed. As seen in Fig. 5, upon completing the backing of the tractor, the saddle holes 46 are aligned with the roll holes 64 to permit all four holes to receive a removable pin 66. In this manner, and at this location, the stripper unit 11 is attached to the tractor 10. It should be noticed that the saddle holes 46 are larger than the shank diameter of the pin 66, and, therefore, the roll and the saddle are free to rotate slightly with respect to each other. With this feature, the alignment of the holes need not be exact before the pin is placed therein, and, also, the unit 11 can pivot slightly with respect to the tractor.

Figs. 1 and 6 show two additional points of attaching the stripper 11 to the tractor 10. As previously mentioned, a pair of truss rods 33 is attached between the elevator housing 27 and the plates 34 which are mounted on opposite ends of the axle housing 37. It is preferred that the lower ends of the rods 33 contain turnbuckles 71 to permit adjustability in the length of each rod. Also, the ends of the rods are attached to the elevator housing strap 35 and to the plates 34 in any conventional way but in a manner so that the rods are not rigidly fastened thereto. Therefore, the rods are slightly movable with respect to those members while maintaining attachment thereto, and this feature, in conjunction with the fit of the pin 66 in the saddle holes 46, as shown in Fig. 5, permits the cotton stripper 11 to pivot slightly with respect to the tractor 10.

The third point of attaching the stripper 11 to the tractor 10 is at the front of the stripper. In this preferred arrangement, a link 72 is vertically pivotally mounted on the plate 34 by a bolt 73. The link 72 then projects forwardly from the tractor axle 14 to where the forward end of the link is attached to a chain 74. The latter is generally vertically suspended from the link 72 and it connects, through a clamp 76, to a bail 77 which is attached to the forward portion of the picking unit 22. Fig. 7 also shows that arrangement and it shows the bails to be of an inverted U-shape with depending ends.

Referring again to the quadrant plate 34, it will be seen that a lever 78 is vertically pivotally mounted on the plate to extend thereabove. The upper end of the lever 78 has the usual operating handle 79 while the lower end carries a conventional rotatable gear 81 which intermeshes with the teeth 82 on the top of the plate 34 to permit minute adjustment of the lever 78 for a reason hereinafter apparent. It should be understood that the handle 79 is operatively engaged with a spring loaded pawl 84 maintained in engagement with the gear 81 by a coil spring 83, the pawl being releasable by the action of handle 79 to permit the gear to rotate in adjusting the lever 78. A bracket 86 is attached to the side of the bottom end of the lever 78 to support a truss rod 87 which extends therefrom to connect with the projecting end of the link 72. The foregoing described construction is present on both sides of the tractor 10.

It should now be apparent that the forward ends of the picking units 22 are suspended by the construction shown in Figs. 1, 6, and 7. With this arrangement, the units 22 can be separately raised and lowered by the levers 78 and by a mounting of the units in a manner described later. Also, the front ends of the units 22 are free to move from side to side.

As previously mentioned, the front ends of the units 22 are provided with gathering points 23 which are pivotally mounted on the units 22 as shown in Figs. 1, 6, and 7. The points 23 are attached to the units 22 by pivot bolts such as the bolt 88, with each gathering point containing one pivot bolt 88 on each side thereof. The bolts 88 are thus positioned horizontally at the location of the lower ends of the bails 77. It should also be understood that a bolt 89 is located above each of the pivot bolts 88, and the bolt 89 also attaches the point 23 to the unit 22. However, to permit the point 23 to pivot, the bolt 89 is received within an arcuate slot 91 in the frame 92 of the point. An additional support is provided by chains 93 which are attached between the bails 77 and the points 23 as shown. In this manner, the points 23 are free to pivot within the limits of the slots 91 and the chains 93, it being understood that each side of the points 23 is like the one complete side shown in Fig. 7. Chains 93 then are available to permit adjustment of the position of the points 23 by adjusting the active length of the chains.

The points 23 are each preferably composed of a pair of vertical sides sheets 94 which are spaced outside of lower and inclined ground shoes 96. The latter are rigidly attached to the points 23 to be integral therewith and to be arranged in pairs on each point as shown in Fig. 6. The inside edges 97 of the shoes 96 are preferably curved inwardly, as shown, and are inclined upwardly to the rear, all for a reason mentioned later. The extreme front of each shoe 96 is provided with a runner 98 which rides on the ground in the forward operating movement of the cotton harvester.

Also, shown in Figs. 7 and 8, is a tie rod 99 which is attached between the inside edges of the bails 77 at brackets 101, which are mounted on the bails. The ends of the rod 99 are secured to the brackets 101 in any well known manner, such as through fastening pins 102. A bracket 103 is removably fastened to the underside of the tractor 10 to present a vertical piece 104 having a slot 106 therein. As shown, the slot 106 is slightly wider than the diameter of the rod 99 which passes through the slot at the mid-section of the rod. Then opposite sides of the piece 104 are flanked by adjusting nuts 107 which are threaded onto the rod 99. In actual assembly, the rod 99 can be initially in two end pieces upon which the nuts 107 are threaded and the two pieces can then be welded together at their inner ends. The rod 99 is then positioned within the slot 106 by inserting it in a top opening in the slot. The bracket 103, with rod 99, is then attached to the tractor as shown.

At this time it should be appreciated that the slot 106 is at a predetermined angle, as shown, to permit vertical pivotal movement of the units 22. Also, the nuts 107 are adjustable along the rod 99 and, as such, they limit the amount of horizontal pivot of the units 22 while the rod itself requires that the horizontal pivot be the same between the units.

The foregoing describes all of the points of connection between the tractor 10 and the cotton stripper 11. At this time, mention is again made of the fact that the bails 77 are removed from the units 11 prior to backing the tractor into the units for effecting the attachment described. Since the bails are made high enough to clear the cotton plants, they are then too high to fit under the tractor axle housings.

Referring now to Figs. 1, 3, and 6, it should be understood that the stripper unit is operated in two rows of cotton plants as the harvester moves forward. In this movement, the cotton plants are engaged by the curved inner edges 97 of the picking unit ground shoes 96. As previously mentioned, but not yet described in structure, the picking units are thus horizontally pivoted to align with the two rows of plants. Figs. 3 and 6 show the mounting of a pair of picking rolls 108 extending longitudinally of each of the units 22 from a lower forward point at the raised rear end of the shoe edges 96, to the upper rearward point of the unit 22. The rolls are preferably conventionally spring biased together to permit the rolls to press the cotton plants from the bottom to the top thereof and, thereby, remove the cotton bolls in the usual manner. In this process the rolls are rotating in opposite directions. The bolls are then dropped into the troughs 109 which are attached one on each side of each unit 22. An auger 111 is rotatably disposed in each trough 109 to convey the cotton bolls axially along the auger and within the trough. In this instance, the auger and the trough are inclined upwardly to the rear, as seen in Fig. 1. The augers 111 are rotating in a direction to move the cotton bolls to the rear of the troughs 109 where the bolls are deposited in a second set of conveyors (not shown) and then are transported to the elevator housing 27 and finally into the wagon 12. The picking operation of the picking units is accomplished by the use of the aforementioned parts which are conventional and need not, therefore, be described more fully. In actual construction, it is preferred that screening 110 be provided over the top of each unit 22 near the operator's seat to protect him from harm.

The following describes the means for effecting the previously mentioned horizontal and vertical pivotal movement of the forward ends of the picking units 22. Referring to Fig. 9, it will be seen that the rear end of the picking unit 22 is shown with parts of the housing removed and broken away to facilitate describing the unit. Here the stripper unit main frame 51 is again shown in part with the angle iron 55 and the interconnecting sheets. Suitably attached, in any well known manner, to the angles 52 and 55, as a rigid part thereof, is a main frame section 112 which is vertically disposed as shown. A sheet 113 forms a part of the section 112, and it should be understood that each side of each unit 22 is provided with a section 112. In this regard, angle irons, such as the horizontally disposed iron 114, are preferred in forming sections 112 as part of the main frame 51. At this time, it should also be noticed that a hitch 115 is attached to the main frame 51 under the elevator housing 27 to provide a means for attaching the wagon 12 to the stripper unit 11.

The pulley 56 is shown mounted on the shaft 57 which is rotatably mounted in collars as 116 secured adjacent each end of the shaft 57 to the main frame sheets 113. A pulley belt extends from the pulley 56 to the fan (not shown) which blows the cotton bolls. The outside end of the shaft 57 actuates two drive chains 117 and 118 which extend, respectively, to a lower auger housing 119 and a pivot shaft 121. The auger housing 119 contains the previously mentioned transverse conveyor auger which transports the picked cotton bolls from the augers 111 to the elevator housing 27. A third horizontally and transversely disposed shaft 122 is rotatably mounted below the shaft 121 and the two are operatively connected by a drive chain 123. Both of the shafts 121 and 122 are mounted by means of collars or bearings 126 and 127, respectively, at the opposite ends of the shafts and the collars are fixed to oppositely disposed picking unit side frames 128. The latter are connected to an intermediate sheet 129 to form a U-shaped rigid frame as shown also in Fig. 10. It should be seen that upper outside edges of each of the auger troughs 109 are attached to the U-shaped frame to be integral therewith so the entire picking unit is attached together as one body and mounted on the stripper main frame 51 as hereinafter described.

Figs. 9 and 10 show the bearing collars 126 attached to the picking unit frames 128 to provide rotational bearing for the shaft 121. The outside faces of the frames 128 have cylindrical hubs 131 attached thereto by welding at 132. The hubs or mounting members 131 project axially of the shaft 121 and beyond the sides of the frames 128. Figs. 10 and 11 further show that one of the stripper main frame sheets 113 contains an oval shaped opening 133 wherein an oval shaped bearing 134 is secured to surround the adjacent hub 131. The hub 134 can be welded to the sheet 113 as shown and is substantially horizontally disposed. Figs. 10 and 12 show the opposite end of the shaft 121 and the hub 131 projecting into a circular opening 136 in the opposite sheet 113. The opening 136 receives a cylindrical bearing 137 so that the hub 131 and bearing 137 are substantially concentric. With this construction, the units 22 are both horizontally and vertically pivotal with and about the shafts 121, it being understood that each unit 22 is constructed as shown in Fig. 9. Thus, the forward ends of the units 22 can be raised by the levers 78 and the ends then pivot about the shafts 121 as the entirety of the units 22 pivots in a vertical plane. Such upward pivotal movement would also occur if the front end of a unit 22 engaged a bump or the like in the ground, thereby saving the machine from possible work stoppage or even serious damage. Also, the shafts 121 permit the units 22 to pivot horizontally about an axis approximately vertically transverse to the shaft within the bearing 137. In this action, one end of the shaft 121 is slightly free to move within the bearing 137 as the opposite end of the shaft can shift horizontally within the limits of the bearing 134. As previously mentioned, the horizontal pivotal movement of the units 22 is induced by the unit shoes 23 aligning themselves with the rows of cotton plants.

Fig. 9 shows a bevel gear 138 non-rotatably attached to the shaft 121 to mesh with a second bevel gear 139 located parallel to the unit frame sheet 129. The gear 139 is the means for drivingly rotating the cotton picking rolls 108. Further, the lower shaft 122 has two bevel gears, such as the gear 141, non-rotatably mounted thereon, and they engage two gears 142 which are positioned along the sheet 129 and provide the drive connection to the two augers 111 of each picking unit 22. A third shaft 143 extends across the bottom of Fig. 9 and is parallel to shafts 121 and 122. The shaft 143 is powered by chain 117 to drive the elevator which is within the housing 27.

While a preferred construction has been shown and described, the scope of this invention should be limited only by the appended claims. However, it should be obvious that certain changes can be made within the scope of this invention. One such change would be to eliminate the truss rods 33 and the chain support 74 to permit the front of the units 22 to slide along the ground on the runners and shoes as mentioned while the stripper attaching frame with the roll 63 supports the stripper at approximately the center of the stripper as shown.

I claim:

1. A tractor mounted and conveyed cotton harvester comprising a cotton stripper main frame mountable onto said tractor, a pair of horizontally oppositely disposed and spaced apart bearings on said main frame, a cotton boll picking unit, a horizontally disposed shaft on said picking unit, said picking unit mounted on said main frame through engagement of said shaft in said bearings with one of the latter arranged to provide horizontal movement of the corresponding engaged end of said shaft with respect to the other end of said shaft and with said picking unit being pivotal with respect to said main frame mounting about said shaft for said picking unit to be vertically and horizontally pivotal with respect to said main frame.

2. In a cotton harvester of the tractor type, the combination comprising a main frame mountable onto said tractor, horizontally oppositely disposed pivot mounting bearings on said main frame, a cotton boll picking unit, horizontally oppositely disposed pivot mounting hubs on said picking unit engaged with said bearings upon mounting of said picking unit on said main frame, and engaged one of said bearings and one of said hubs being cylindrical to provide vertical pivotal movement of said picking unit on said main frame, the opposite engaged one of said hubs and one of said bearings being one cylindrical and the other horizontally elongated to provide horizontal and vertical pivotal movement of said picking unit on said main frame.

3. In a cotton harvester of the tractor type, the combination comprising a main frame mounted on said tractor, a cotton boll picking unit vertically and horizontally pivotally mounted on said main frame, a lever mounted on said tractor, a chain attached between the front of said picking unit and said lever for vertically adjustably suspending said picking unit from said tractor and thereby limit the vertical pivot of said picking unit with respect to said tractor.

4. In a cotton harvester of the tractor type, the combination comprising a main frame mounted on said tractor, a cotton picking unit vertically and horizontally pivotally mounted on said main frame, a flexible connector attached to the front end of said picking unit, means on said flexible connector for adjustably attaching said flexible connector to said tractor for adjustably suspending the front end of said picking unit from said tractor, means on said picking unit for adjustably limiting the amount of horizontal pivotal movement of said picking unit on said main frame.

5. A cotton harvester comprising a main frame, a picking unit attached to said main frame, mating mountings on each of said main frame and said picking unit for attaching therebetween with said mountings of said picking unit located at the rear end thereof, said mating mountings being cylindrical and concentrically arranged for relative rotation therebetween with the axes thereof horizontal for vertically pivotally mounting said picking unit front end with respect to said main frame, and a chain on said picking unit for suspending said front end on said harvester to adjustably limit the vertically downward pivot of said picking unit front end.

6. A cotton harvester comprising in combination a main frame, a cotton picking unit attached to said main frame through horizontally spaced apart mating mountings on said main frame and the rear of said picking unit, said mountings arranged in two spaced apart sets with one of said sets being fixedly disposed and the other of said sets being horizontally movable with respect to said one for said picking unit to pivot horizontally on said main frame and with said mountings on said picking unit being cylindrical and disposed on a horizontal axis to permit vertical pivotal movement of said picking unit about said axis and with respect to said main frame, a rigid length connector attached to the front end of said picking unit and said harvester for adjustably limiting the downward movement of said front end with respect to said harvester, a pair of spaced apart ground shoes attached to said front end of said picking unit for engaging the ground, the inner edges of said shoes being curved edges for engaging opposite sides of cotton plants for horizontally pivoting said picking unit into alignment with said plants.

7. In a cotton harvester of the tractor type, the combination comprising a main frame mountable onto said tractor, a pair of spaced apart and horizontally aligned bearings on said main frame, a cotton picking unit, a shaft horizontally disposed on said picking unit at the rear end thereof, the opposite ends of said shaft rotatably engaged in said bearings with one end thereof movable in a horizontal direction relative to the other end of said shaft for both vertical and horizontal pivot of said picking unit on said main frame, adjustable means on said picking unit at the front end thereof for engagement with said tractor to limit horizontal pivotal movement of said picking unit in a selected amount, and adjustable means on said picking unit at said front end for engagement with said tractor to limit vertical pivotal movement of said picking unit in a selected amount.

8. In a cotton harvester of the tractor type, the combination comprising a main frame mountable onto said tractor, a pair of spaced apart and horizontally aligned bearings on said main frame, a cotton picking unit, a shaft horizontally disposed on said picking unit at the rear end thereof, the opposite ends of said shaft rotatably engaged in said bearings with one end thereof movable in a horizontal direction relative to the other end of said shaft for both vertical and horizontal pivot of said picking unit on said main frame, and means on said picking unit at said front end for engagement with said tractor to limit vertical pivotal movement of said picking unit.

9. In a cotton harvester of the type including an articulated picking unit, the combination comprising a main frame, two laterally spaced apart bearing members on said main frame with one of said bearing members arranged to present a bearing surface in a range of locations in the longitudinal direction of said harvester and with respect to the other of said bearing members, a cotton boll picking unit, two mounting members laterally spaced apart on said picking unit for respective engagement with said bearing members and rotatable about an axis between said bearing members for vertical pivotal movement of said picking unit on said main frame, one of said mounting members engaged with said one of said bearing members for mating therewith in various positions along said bearing surface for horizontal pivotal movement of said picking unit on said main frame.

10. In a cotton harvester of the type including an articulated picking unit, the combination comprising a main frame, two laterally spaced apart bearing members on said main frame with one of said bearing members arranged to present a bearing surface in a range of locations in the longitudinal direction of said harvester and with respect to the other of said bearing members, a cotton boll picking unit, two mounting members laterally spaced apart on said picking unit for respective engagement with said bearing members and rotatable about an axis between said bearing members for vertical pivotal movement of said picking unit on said main frame, one of said mounting members engaged with said one of said bearing members for mating therewith in various positions along said bearing surface for horizontal pivotal movement of said picking unit on said main frame, and suspension means on said picking unit for limiting vertical pivotal movement thereof and supporting the front end of said picking unit.

References Cited in the file of this patent

UNITED STATES PATENTS

| | | |
|---|---|---|
| 2,375,848 | Hume | May 15, 1945 |
| 2,406,058 | Boone | Aug. 20, 1946 |
| 2,507,711 | Hardy et al. | May 16, 1950 |
| 2,538,748 | Fergason | Jan. 23, 1951 |
| 2,560,974 | May | July 17, 1951 |
| 2,571,224 | Edwards | Oct. 16, 1951 |
| 2,662,360 | Roscoe | Dec. 15, 1953 |
| 2,760,325 | Witt | Aug. 28, 1956 |